United States Patent
Hasegawa et al.

(10) Patent No.: US 6,856,410 B1
(45) Date of Patent: Feb. 15, 2005

(54) PREPARATION METHOD OF DIGITAL PRINT AND APPARATUS THEREOF

(75) Inventors: Masataka Hasegawa, Hino (JP); Muneyoshi Matsunami, Hino (JP)

(73) Assignee: Konica Corporation, Tokyo (JP)

( * ) Notice: Subject to any disclaimer, the term of this patent is extended or adjusted under 35 U.S.C. 154(b) by 795 days.

(21) Appl. No.: 09/668,865

(22) Filed: Sep. 25, 2000

(30) Foreign Application Priority Data

Sep. 30, 1999 (JP) .......................................... 11-278063

(51) Int. Cl.⁷ .............................. G06F 15/00; G06K 9/00
(52) U.S. Cl. ..................... 358/1.11; 358/500; 358/515; 358/520; 358/527; 382/164
(58) Field of Search .............................. 358/1.11, 1.18, 358/1.9, 462, 500, 520, 515, 527; 382/266, 162–168, 201, 282

(56) References Cited

U.S. PATENT DOCUMENTS 5,719,967 A * 2/1998 Sekine ....................... 382/266
5,783,356 A * 7/1998 Bosschaerts et al. ........ 430/240

* cited by examiner

*Primary Examiner*—Twyler Lamb
(74) *Attorney, Agent, or Firm*—Frishauf, Holtz, Goodman & Chick, P.C.

(57) ABSTRACT

There is described a method and apparatus for producing prints, such as post cards, etc. The print producing apparatus includes a processor to generate a second character information by applying a first processing to a first character information and to generate a second image information by applying a second processing, being different from the first processing, to a first image information, after extracting the first character information and the first image information separately from a first image data which includes the first character information and the first image information, so as to generate a second image data which includes the second character information and the second image information, and a printer to produce prints by forming images, based on the second image data generated by the processor.

12 Claims, 11 Drawing Sheets

FIG. 5 (1)
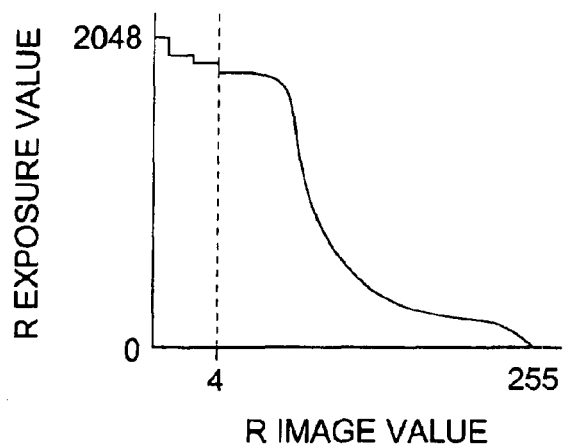
FIG. 5 (2)
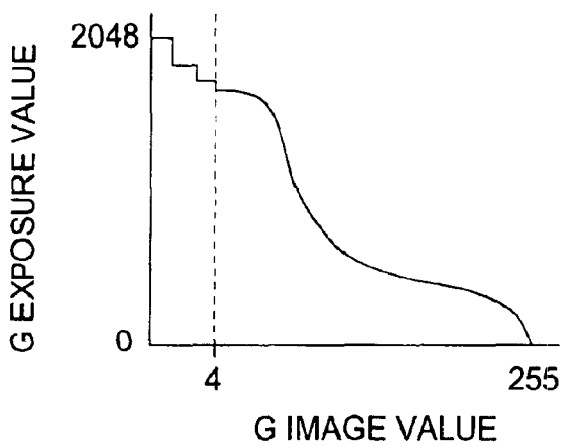
FIG. 5 (3)
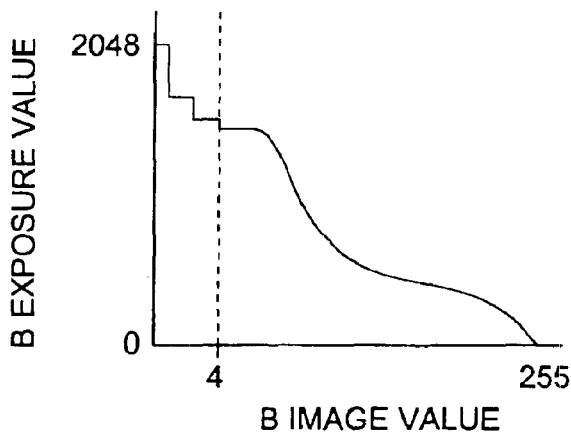

FIG. 11    EXAMPLE OF LUT FOR IMAGE
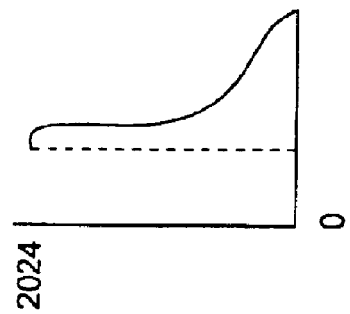
B EXPOSURE
CONTROL VALUE
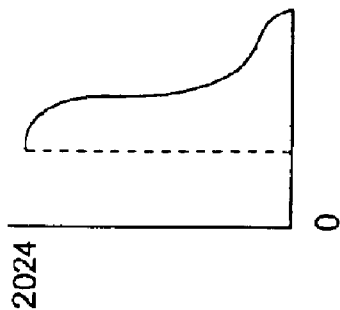
G EXPOSURE
CONTROL VALUE
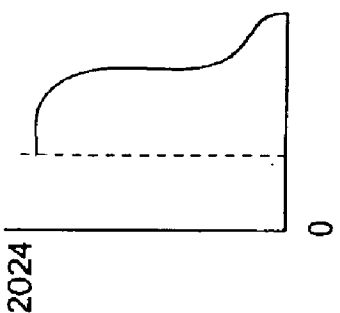
R EXPOSURE
CONTROL VALUE

PREPARATION METHOD OF DIGITAL PRINT AND APPARATUS THEREOF

BACKGROUND OF THE INVENTION

The present invention relates to a preparation method of digital prints by which post cards are printed by a digital printer according to the data including the digital character information and the digital image information, and to an apparatus thereof.

Post cards in which characters and images are combined with each other, are conventionally known. As a method to prepare such the composite post card, other than a classic method in which characters are expressed by an ordinary printing technique using letterpress printing, or lithography, on images expressed by silver halide photography, a method in which both of the character information and the image information are made to the digital information, and printed by a digital printer, is spread in common together with a digital camera.

In the conventional printing method, when the printing is conducted on the same sized printing paper, both of the character information and the image information are processed as one digital data of 8 bits for each of, for example, R (red), G (green), B (blue), and at the time of printing, the printing is conducted by using a LUT (Look Up Table) for controlling the digital data to the exposure characteristic appropriate to the coloring of the print paper and for outputting it. However, because the color and the image density are different in the character information and the image information, when the character data and the image data are converted by the single LUT, in the print, there is a case where disharmony is generated in a character portion and an image portion. For example, specifically for a fine line, MTF is lowered, the density is decreased, or because the short time exposure characteristic and MTF (gradation) are different depending on the color, the color balance is changed, and therefore, when the print of the character image is conducted by the LUT for general image use, there is a problem that the desired color is hardly obtained. Specifically, in the character which is expressed in many cases by fine lines, the influence of the MTF is easily generated. Further, the influence of the MTF is different for each color (R, G, B). Therefore, a black fine line is reproduced to the different color from "black" due to the influence of the MTF, and the disorder of the color balance of black used as the character generates the reddish or bluish color tone which easily attracts peoples notice (conspicuous).

The above description will be detailed below.

As shown in FIG. 6, there is a color image output apparatus 1 such as color printers by which the color image is formed by coloring the color material of 3 colors of C (cyan), M (magenta), and Y (yellow) at a predetermined gradation. In this apparatus, after the input image data RGB of 3 colors is gradation-converted by an LUT 5 having one dimensional LUTs (Look Up Table) 2–4 for gradation correction, it is supplied to an exposure section 6. The exposure section 6 is structured such that laser diodes which emit the R, G, and B-colored light beams are driven corresponding to the output image data RGB of 3 color phases after the gradation correction by one dimensional LUTs 2–4, and each laser light beam L is irradiated on the color photosensitive material (paper), thereby, a latent image is formed on the color photosensitive material (paper), and by conducting a predetermined development processing on the color photosensitive material (paper) on which the latent image is formed, the color photosensitive-material (paper), on which an image of 3 color phases of CMY as a visual image is formed, can be obtained.

The color image output apparatus 1 as described above, is used, for example, as a proofer (called printing proofer) of a color printing machine. A reason in which the color image output apparatus is used as the printing proofer, is as follows: before the actual color print is prepared by a color printing machine using a rotary press, a proof print on which a color image is formed for the proof, (called color printing proof) is prepared, and because, in the printing proofer, a process of the press plate which is necessary for the color printing machine, is not necessary, a color print (a hard copy on which the color image is formed) can be prepared a plurality of times and easily, in a short period of time.

That is, by simulating the color of the color print to be prepared by a color printing machine which is to be used from now by using the trial print of the color image output apparatus 1, the color can be easily confirmed in a before process of the actual printing.

Incidentally, in this type of color image output apparatus 1, there is no possibility that the gradation correction characteristics (called also gradation characteristics) of LUTs 2–4 which are previously installed in the apparatus corresponding to any printing condition (condition of ink, sheet and printing machine itself), perfectly coincide with the printing condition (desired printing condition) of the printing machine actually to be used by the user. Therefore, when the printing proof corresponding to a desired printing condition is prepared, for optimizing the dynamic range of the density corresponding to the desired printing condition, it is necessary that the gradation characteristics of LUTs 2–4 are corrected (modified), and the LUT is optimized corresponding to the desired printing condition. In the same manner, it is necessary that the temperature change of the dynamic range is divided into several ranges, and the optimum LUT is respectively prepared for each of ranges.

Accordingly, for example, for the input image data RGB, when the target gradation (target density gradation) of each color of CMY on the film F is set to the target gradation (target density gradation) Dc0, Dm0, Dy0 as shown in FIG. 7, corresponding to the desired printing condition, it is necessary that the gradation characteristics of each of reference one dimensional LUTs 2–4 previously installed corresponding to the reference printing condition are corrected (modified) so that the input image data RGB coincides with these target gradations Dc0, Dm0, Dy0, by each of one dimensional LUTs 2–4 constituting the LUT 5 for the gradation correction.

In this case, in the gradation correction method in the conventional color image output apparatus 1, as shown in the flow chart in FIG. 8, initially, each of the image data R, G, B constituting the input image data RGB is respectively increased by a predetermined gradation, supplies to the exposure section 6 through each of reference (originally installed in the color image output apparatus 1) one dimensional LUTs 2–4, outputs the monochromatic patch of each color of CMY (step S1) onto the film F by the laser light beam L of each color of RGB, and the density Dc, Dm, Dy of each monochromatic patch is measured (step S2).

Next, the measured density Dc, Dm, Dy and the target gradations Dc0, Dm0, Dy0 are compared for each of the patch having a predetermined gradation, and the difference is outputted (step S3), and it is judged whether the difference is a value within the desired difference (step S4).

However, in the objective print and the output patch, because the spectral characteristic is different due to the difference of the coloring material, even when the density value coincides with each other, a tone of color when it is looked at, is different from each other. Accordingly, the judgement in step S4 is NO, and by correcting the corresponding relationship (conversion relationship) of each of the RGB values of the input image data RGB and each of RGB values of the output image data RGB of the one dimensional LUTs 2–4 by trial and error corresponding to the difference found in step S4, one dimensional LUTs 2–4 are corrected (step S5).

Then, by repeating processings from step S1 to step S5 until the judgement in step S4 is accomplished, one dimensional LUTs 2–4 after the gradation correction in which the measured density Dc, Dm, Dy and the target gradations Dc0, Dm0, Dy0, are values within a predetermined range, are obtained.

In the gradation correction method in the above-described conventional color image output apparatus 1, because the correction (modification) of the gradation characteristic (input output corresponding relationship) of one dimensional LUTs 2–4 is conducted by trial and error, according to the correction of one dimensional LUTs 2–4 corresponding to the above difference, one dimensional LUTs 2–4 after correction is used and the monochromatic patch is printed out, the density measurement is conducted for each print out, and because it is necessary that the operation comparing to the target gradation is repeated many times, a lot of time is necessary, and there is a problem that the high degree of skill is necessary for the determination itself of the correction amount according to the difference.

Japanese Tokkaihei No. 11-262033 teaches that, in order to solve the above problem, when the character information and the image information are composed, by composing them after conducting the predetermined processing on the character information and/or image information, the character portion and the image portion are harmonized.

SUMMARY OF THE INVENTION

As described above, when the digital print of the character information and the image information is conducted on the print paper by a single LUT, there is a disadvantage that the color balance is changed and the objective color is hardly obtained. When black in the character is prior to the other, the balance of the image is changed, or when the kind of the character or the thickness of the character is changed, there is a case where the color is changed for each character. In the resolving method disclosed in the above Japanese Tokkaihei No. 11-262033, the processing time necessary for the composition of the information becomes not only a delay in the print time, but the skill is also necessary for attaining the harmony of the image, therefore, being combined with the requirement of the simplification of the apparatus operation, it is not appropriate for the post card preparing system by the self-service of the user.

In view of the foregoing problems, the object of the present invention is to clear a preparing method of the digital print by which the print can be conducted in the harmonized condition of the character information and the image information, and the apparatus for the method.

Accordingly, to overcome the cited shortcomings, the abovementioned object of the present invention can be attained by print producing apparatus and method for producing prints described as follow.

(1) A print producing apparatus, comprising: a processor to fig generate a second character information by applying a first processing to a first character information and to generate a second image information by applying a second processing, being different from the first processing, to a first image information, after extracting the first character information and the first image information separately from a first image data which includes the first character information and the first image information, so as to generate a second image data which includes the second character information and the second image information; and a printer to produce prints by forming images, based on the second image data generated by the processor.

(2) The print producing apparatus of item 1, wherein the printer produces the prints by forming images on silver-halide photosensitive materials, based on the second image data generated by the processor.

(3) The print producing apparatus of item 1, further comprising: an inputting section to input the first image data, wherein the processor comprises, a discriminating processor to apply a third processing to the first image lm data, so that the first character information and the first image information, both of which are included in the first image data inputted from the inputting section, can be discriminated each other, and an image processor to generate the second character information by applying the first processing to the first character information and to generate the second image information by applying the second processing, being different from the first processing, to the first image information, after extracting the first character information and the first image information separately from the first image data processed by the third processing, so as to generate a second image data which includes the second character information and the second image information.

(4) The print producing apparatus of item 1, wherein a character information LUT is employed for the first processing, while a image information LUT is employed for the second processing.

(5) The print producing apparatus of item 4, wherein the processor revises the character information LUT to a revised character information LUT, and the processor applies the first processing to the first character information by employing the revised character information LUT.

(6) The print producing apparatus of item 3, wherein a range of values included in the first image data is divided into a character region for character information and an image region for image information, and the discriminating processor applies a third processing to the first image data, so that the first character information and the first image information can be discriminated each other, based on the range of values included in the first image data.

(7) The print producing apparatus of item 6, wherein image data regions of 24 bits constitute the first image data, and the image data regions include the first character information and the first image information.

(8) A method for producing prints, comprising steps of: extracting a first character information and a first image information separately from a first image data which includes the first character information and the first image information; generating a second character information by applying a first processing to the first character information and generating a second image information by applying a second processing, being different from the first processing, to the first image information; and producing prints by forming images, based on the second image data.

(9) The method of item 8, wherein, in the step of producing in prints, the images are formed on silver-halide photosensitive materials, based on the second image in the step of producing prints.

(10) The method of item 8, further comprising a step of: inputting the first image data, before the extracting step, wherein the extracting step comprises steps of, applying a third processing to the first image data, so that the first character information and the first image information, both of which are included in the first image data, can be discriminated each other; and generating the second character information by applying the first processing to the first character information and generating the second image information by applying the second processing, being different from the first processing, to the first image information, after extracting the first character information and the first image information separately from the first image data processed by the third processing, so as to generate a second image data which includes the second character information and the second image information.

(11) The method of item 8, wherein a character information LUT is employed for the first processing, while a image information LUT is employed for the second processing.

(12) The method of item 11, wherein the processor revises the character information LUT to a revised character information LUT, and the processor applies the first processing to the first character information by employing the revised character information LUT.

(13) The method of item 10, wherein a range of values included in the first image data is divided into a character region for character information and an image region for image information, and the discriminating processor applies a third processing to the first image data, so that the first character information and the first image information can be discriminated each other, based on the range of values included in the first image data.

(14) The method of item 13, wherein image data regions of 24 bits constitute the first image data, and the image data regions include the first character information and the first image information.

(15) A print producing apparatus, comprising: a processor to generate a second character information by applying a first processing to a first character information and to generate a second image information by applying a second processing, being different from the first processing, to a first image information, after extracting the first character information and the first image information separately from a first image data which includes the first character information and the first image information, so as to generate a second image data which includes the second character information and the second image information; and an inputting section to input the first image data to the processor.

Further, to overcome the abovementioned problems, other methods and apparatus, embodied in the present invention, will be described as follow.

(16) A digital print preparing method, in which the character information and the image information are composed and outputted on the print paper, wherein the numeric value range of the composite image data area is divided into 2 areas of a character area and an image area; the data is processed so that the character information is accommodated in the character area of the image data area, and the image information is accommodated in the image area of the image data area, and each information is accommodated in each area; and the composite image is obtained according to the accommodated composite image data.

(17) The digital print preparing method according to item 16, wherein a character exposure area and an image exposure area of the print paper are respectively separated from and independent of each other and output exposure controlled according to the character area data and the image area data.

(18) The digital print preparing method according to item 16, wherein, when the character information is data-processed into the character area, an LUT or a character table is used.

(19) The digital print preparing method according to item 16, wherein, when the image information is data-processed into the image area, an LUT different from the LUT in item 18, or a limiter is used.

(20) The digital print preparing method according to item 17, wherein, when the character area data is separated from and independent of the other and output exposure controlled, the LUT or the character table is used.

(21) The digital print preparing method according to item 17, wherein, when the image area data is separated from and independent of the other and output exposure controlled, an LUT different from the LUT in item 20 or a character table is used.

(22) The digital print preparing method, which is characterized in that the character tables in item 18 and item 19 have the structure by which an image value and exposure value can be changed corresponding to the character size, typeface, and color.

(23) The image data area according to any one of items 16–22 is structured by 24 bits in the overall area, and the image data area includes areas for the character information and the image information.

(24) The digital print preparing method, which is characterized in that the image data in any one of items 16–23 is obtained by digital conversion of the image data of an analog image recording medium (film, print).

(25) The digital print preparing method, which is characterized in that the image data in any one of items 16–23 is obtained from a digital image recording medium.

(26) The digital print preparing method according to any one of items 16–25, wherein a plurality of kinds (for negative film, for positive film, the other) of LUTs for the output exposure control or limiters are provided.

(27) A digital print preparing apparatus, in which the character information and the image information are composed and outputted on the print paper, wherein the apparatus has a means for dividing the numeric value range of the composite image data area into 2 areas of a character area and an image area; for processing the data so that the character information is accommodated in the character area of the image data area, and the image information is accommodated in the image area of the image data area; and for accommodating each information in each area, and wherein the composite image is obtained according to the accommodated composite image data.

(28) The digital print preparing apparatus according to item 27, wherein the character exposure area and the image exposure area of the print paper are respectively separated from and independent of each other according to the character area data and the image area data, and output exposure controlled.

(29) The digital print preparing apparatus according to item 27, wherein, when the character information is data-processed into the character area, the LUT or the character table is used.

(30) The digital print preparing apparatus according to item 27, wherein, when the image information is data-processed into the image area, an LUT different from the LUT in item 29, or a limiter is used.

(31) The digital print preparing apparatus according to item 28, wherein, when the character area data is separated from and independent of the other and output exposure controlled, an LUT or a character table is used.

(32) The digital print preparing method according to item 28, wherein, when the image area data is separated from and independent of the other and output exposure controlled, an LUT different from the LUT in item 30 or a character table is used.

(33) The digital print preparing apparatus, which is characterized in that the character tables in item 29 and item 30 have the structure by which an image value and exposure value can be changed corresponding to the character size, typeface, and color.

(34) The image data area according to any one of items 27–33 is structured by 24 bits in the overall area, and the image data area includes areas for the character information and the image information.

(35) The digital print preparing method, which is characterized in that the image data in any one of items 27–34 is obtained by digital conversion of the image data of an analog image recording medium (film, print).

(36) The digital print preparing apparatus, which is characterized in that the image data in any one of items 27–34 is obtained from a digital image recording medium.

(37) The digital print preparing apparatus according to any one of items 27–36, wherein a plurality of kinds (for negative film, for positive film, the other) of LUTs for the output exposure control or limiters are provided.

(38) A digital print preparing method, in which the character information and the image information are composed and outputted on the print paper, a digital print preparing method is characterized in that the image data is divided into an output area (numeric value range) of the character information and an output area (numeric value range) of the image information, and the composite image is obtained by each independent LUT.

(39) The digital print preparing method according to item 38, wherein the output of the character information is conducted by the character table or LUT, and the output of the image information is conducted by the LUT or limiter.

(40) A digital print preparing apparatus, in which the character information and the image information are composed and outputted on the print paper, a digital print preparing apparatus is characterized in that the image data is divided into an output area (numeric value range) of the character information and an output area (numeric value range) of the image information, and the composite image is obtained by each independent LUT.

(41) The digital print preparing apparatus according to item 40, wherein the output of the character information is the character table or LUT, and the output of the image information is the LUT or limiter.

BRIEF DESCRIPTION OF THE DRAWINGS

Other objects and advantages of the present invention will become apparent upon reading the following detailed description and upon reference to the drawings in which:

FIG. 5 is a graph showing an example of a composite LUT in FIG. 4;

FIG. 11 is a graph showing example of image LUTs.

DETAILED DESCRIPTION OF THE PREFERRED EMBODIMENT

Figure 1:
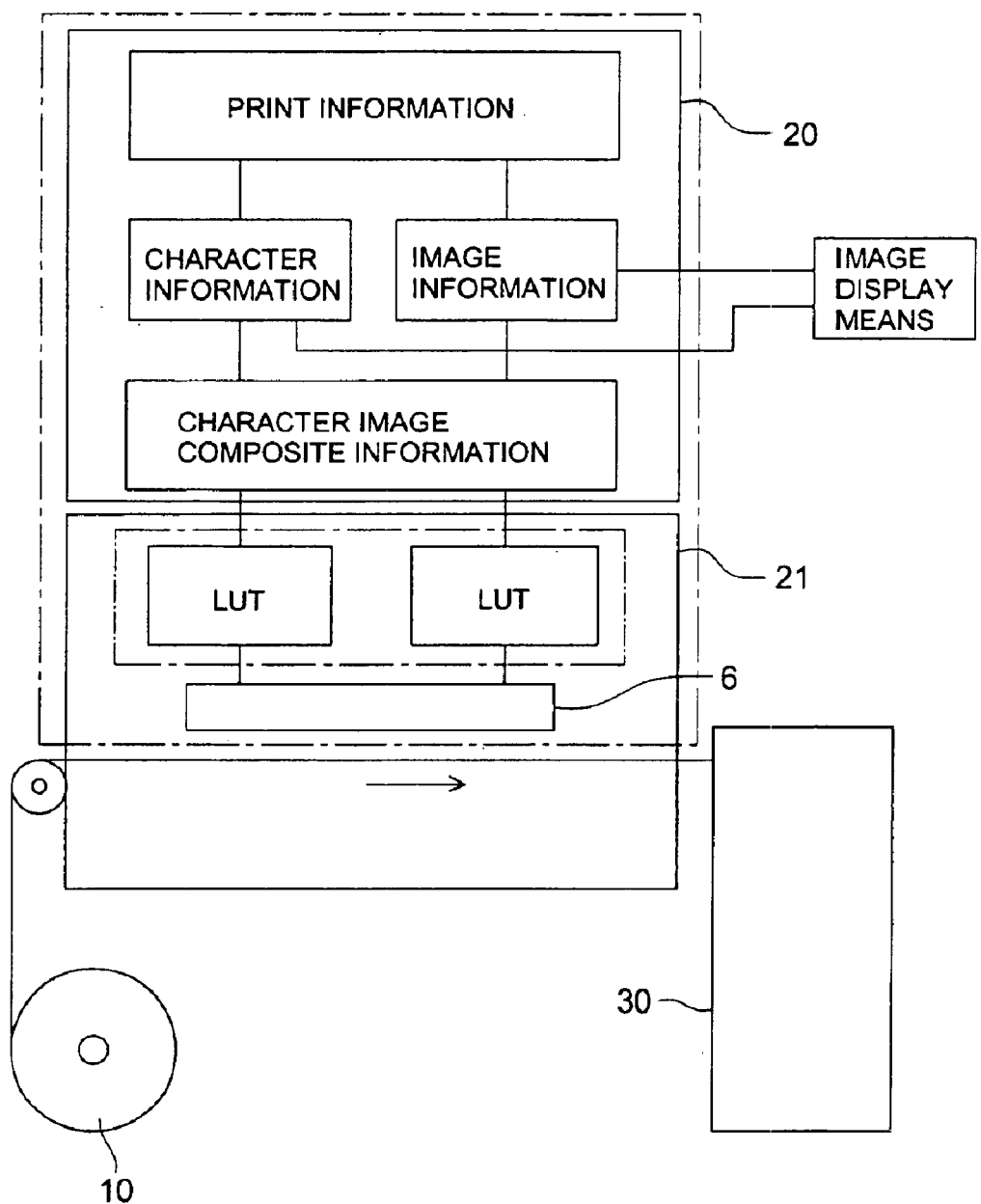
FIG. 1 is a schematic view of a digital print preparing apparatus according to the present invention.

According to FIG. 1, a digital print preparing apparatus according to the present invention will be described below.

A print paper 10 is a silver halide photosensitive material prepared in a form of a roll, and has a width of various standards. For example, a post card has the width (or the length) of a regular shaped postal card regulated by the postal law, and is cut to a sheet of postcard, and successively conveyed to the front surface of an output apparatus 21 of the print information, and is exposed. Incidentally, the cutting may be conducted after the exposure, and further, the print paper may be structured such that it is not in a form of a roll, but the print paper like a sheet-leaf form is prepared and the sheet is pulled out one sheet by one sheet, and conveyed. Further, it is not necessary that the base of the print paper 10 is the paper, but may be the synthetic paper or a board having various thickness, or a synthetic resin plate, or the like. The print paper 10 which is exposed for each of R (red), G (green), and B (blue) by an output apparatus 21, which will be described later, is sent to a paper automatic processor 30 and development processed.

Figure 2:
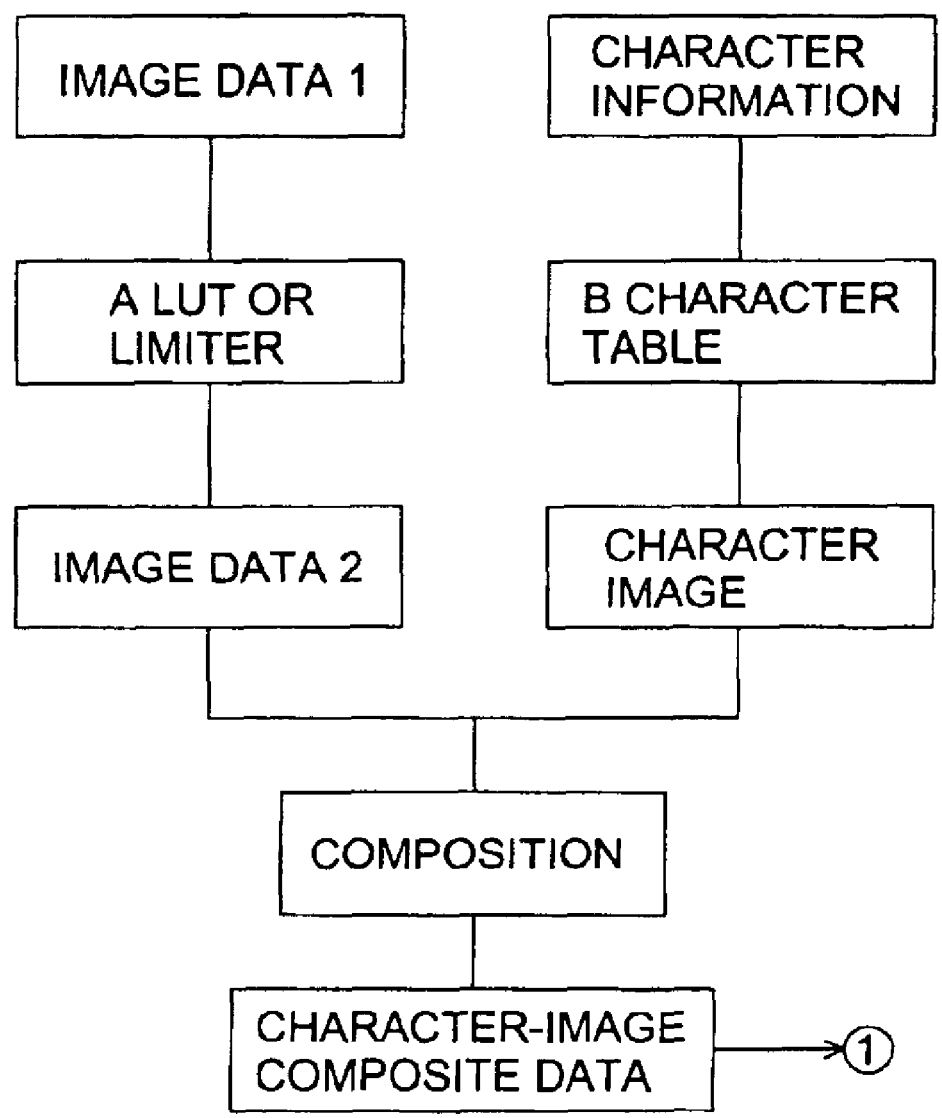
FIG. 2 is a flow chart showing an image data preparing method.
Figure 9:
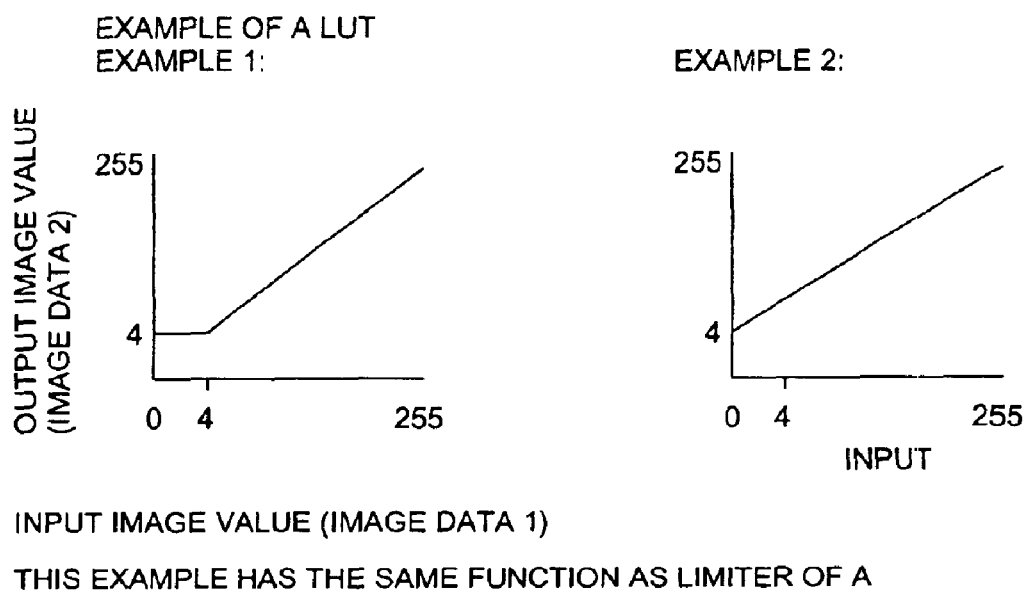
FIG. 9 is a graph showing an example of a LUT of A.

Herein, a method by which the image information is converted into the numeric value area for image and the character information is converted into the numeric value area for character, and a composite image is formed, will be described by using FIG. 2. As shown in FIG. 2, the image information is inputted by the LUT of the table A or limiter, and the character information is inputted by the character table of the table B, and composed, and outputted as the information (1). Herein, as the example of the LUT of A, the in example 1 or the example 2 in FIG. 9 are preferably used, and as the limiter of A, the following is used.

An Example of the Limiter of A

When the image values (R, G, B) of each pixel of the image data is the following condition, the processing (conversion) conducted so that these do not enter into the numeric area for the character.

If R<4, then R=4

If G<4, then G=4

If B<4, then B=4

It is preferable that the table B in Table 1 is used as the character table.

The character information is recorded in each kind of recording medium such as a floppy disk by a key board operation of another apparatus, and through these external recording media, read in a recording means (temporary recording means) in the control apparatus 20. It may also be structured such that the character information is directly recorded in a (primary) recording means by using an input means such as the key board belonging to the character table, without intervention of the external recording medium.

On the other hand, when the image information is recorded in the recording medium housed in the digital camera, the recording information is read in the primary recording means in the control apparatus 20. Further, when the image information is the positive photography or the analog information of the negative film, after the reading of the analog information by a scanner, it is A/D converted and read in the (primary) recording means. In this case, the character information and the image information are discriminated by identification mark including the title.

Next, the composition of the character information and the image information, which is conducted in the control apparatus 20, will be described. As described above, in the conventional print method, the single LUT is used, and the character information (character code, position, size, typeface, color, etc) is converted into the character image, and is composed with the image information, and one image data is formed, and one pair of LUTs (one for each of R, G, B) which are common to the character information and the image information, are used, and the exposure is conducted on the paper by the digital exposure apparatus. In contrast to this, in the method of the present invention, a print scope (position) of the print paper projected onto the operation image plane of the printer is set by being separated from and independent of each other to the character information output range (position) (a position at which the character is printed) and the image information output range (position) (a position at which the image is printed), and the character information and the image information are read out (projected) in respective positions.

That is, the print area is divided into the character information output area (the character data: the numeric value range (R, G, B) of the character image value is the character only area) and the image information output area (the image data: the numeric value range (R, G, B) of the image value is the image only area), and the character data and the image data are composed into one image data. Even when one pixel of the image data is aimed at, it can be seen whether the data belongs to the character image or the image, from the numeric value of R, G, B. It is judged whether the image value of each pixel of the composite image is in the character numeric value area.

For example, if $0 \leq R \leq 3$, $0 \leq G \leq 3$, and $0 \leq B \leq 3$, it is judged to be the character pixel. When the pixel is in the character numeric area, table C in Table 1 is used and the character image value is converted into the exposure control value for the character. When the pixel is in the in image numeric value area, it is converted into the exposure control value for the image (the LUT in FIG. 5 is used). Even the image data after the character and the image is composed once, because the character and the image are separated from the image value and the exposure control can be separately conducted (the character and the image can be exposed by using the respective LUTs), even a composite image of the character image the print character color density of the character image can be adjusted at the time of exposure, separately from the image.

In the case where the character data area and the image data area are not separated as in the conventional case, when the character color/density is adjusted, it is necessary that the character data is corrected and the re-composite image is prepared. It is preferable that the set both ranges (positions) are discriminated on the image plane by the color, kind of surface, etc.

Operations such as the change of the output range (position) (layout), reduction and enlargement, trimming are conducted on the character image plane and the image plane of the image, in which the data is called out in the respective ranges (positions), and displayed on the image plane.

When several regular forms of the character information output range (position) and the image information output range (position) are prepared, and the print is conducted according to a specific form selected by the user, the character information and the image information, which are read in, are automatically discriminated by using the discrimination mark, and the information is transmitted to respective LUTs (for example, A, B in FIG. 2), and respectively converted. After that, the character information and the image information are composed. As described above, when the character information and the image information can be automatically discriminated, the means to record the both information may be a single one.

When the above operations (the preparation of the composite image) are completed, the print is conducted by the output apparatus 21, and the characteristic structure in the present invention is a point that the output of the character information and the image information is conducted by using different LUTs. As the output conversion means to be used, the table for the character or the LUT is used as the output for the character print, and the LUT or limiter is used as the output for the image print.

Figure 10:
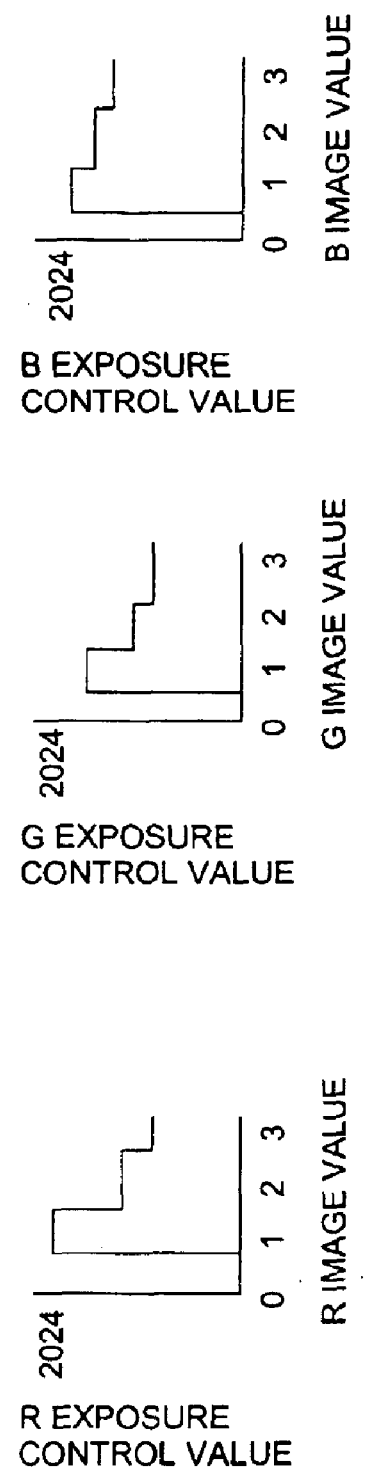
FIG. 10 is a graph showing examples of character LUTS.

For the table for the character, LUT, and limiter, used in the present invention, all kinds of known means may be used without any special limitation, and for example, as the LUT for the character, the LUT in FIG. 10, and as the LUT for the image, FIG. 11 can be used.

A specific example of the output method to operate the output apparatus 21 will be described below.

Figure 3:
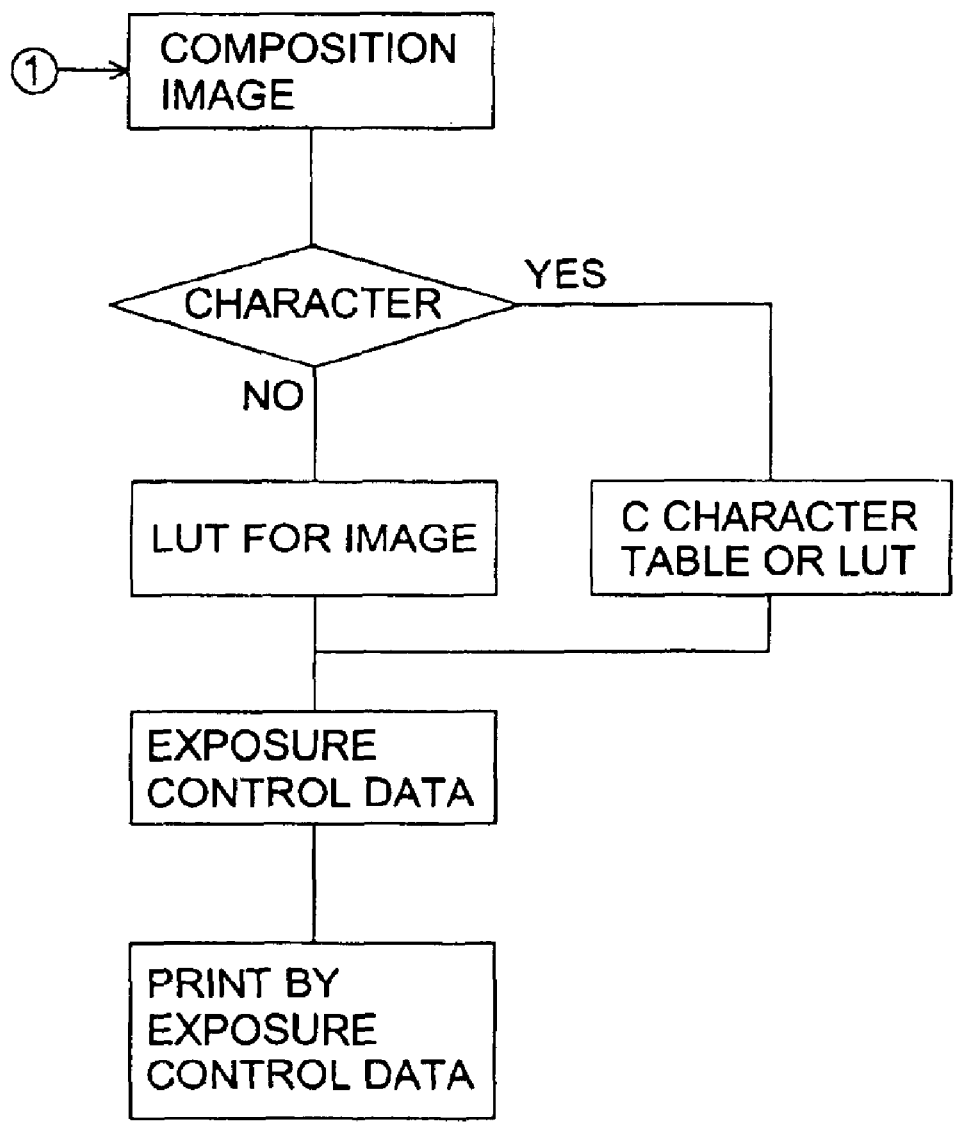
FIG. 3 is a flow chart showing an image data output method.

In the method shown in FIG. 3, in the data (1) of the composed image in FIG. 2, for the character information, the character table of the table C or LUT is selected and outputted, and for the image information, the LUT for the image is selected and outputted. In that case, the output of the output apparatus of both data is controlled by respective exposure control data (LUT).

That is, the character data and the image data are separated from the data of the image prepared in FIG. 2, and processed by using respective LUTs. Herein, as the LUT for the character data, the LUT having the characteristics by which the decrease of the density is suppressed by increasing the exposure amount so that the decrease of MTF, which is decreased as the thickness of the character becomes fine, is compensated, is preferable.

After the example of C character LUT and the example of the image LUT in FIG. 3 are composed and one image value→exposure control value conversion LUT (composite LUT) is prepared, the exposure control value data (exposure control value image) of the character image composite image of (1) is prepared by the composite LUT. In this case, it is not necessary to judge whether the image value of the composite image of (1) is in the character·numeric value area, or in the image value area.

Figure 4:
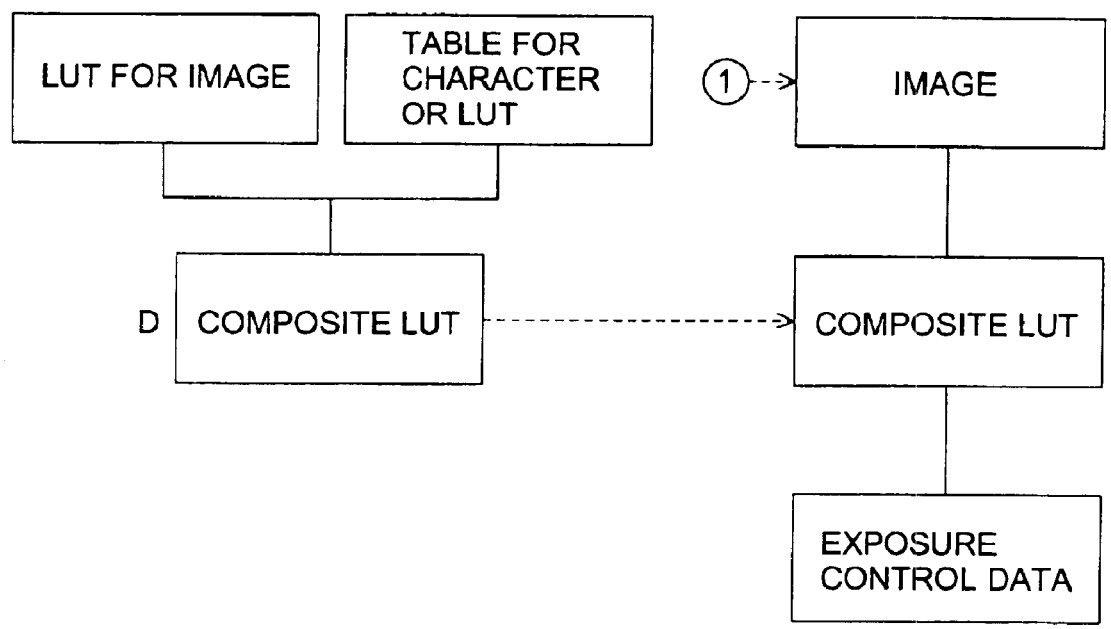
FIG. 4 is another flow chart showing an image data output method.
Figure 6:
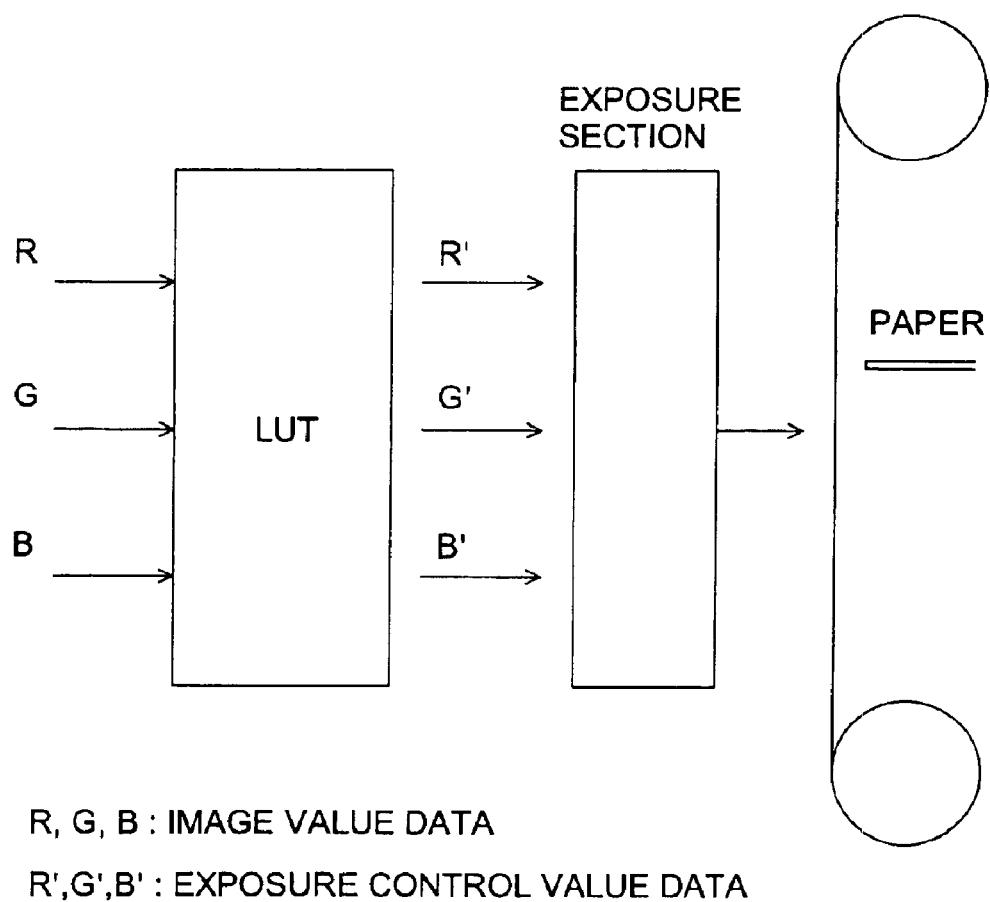
FIG. 6 is a block diagram showing a conventional example.
Figure 7:
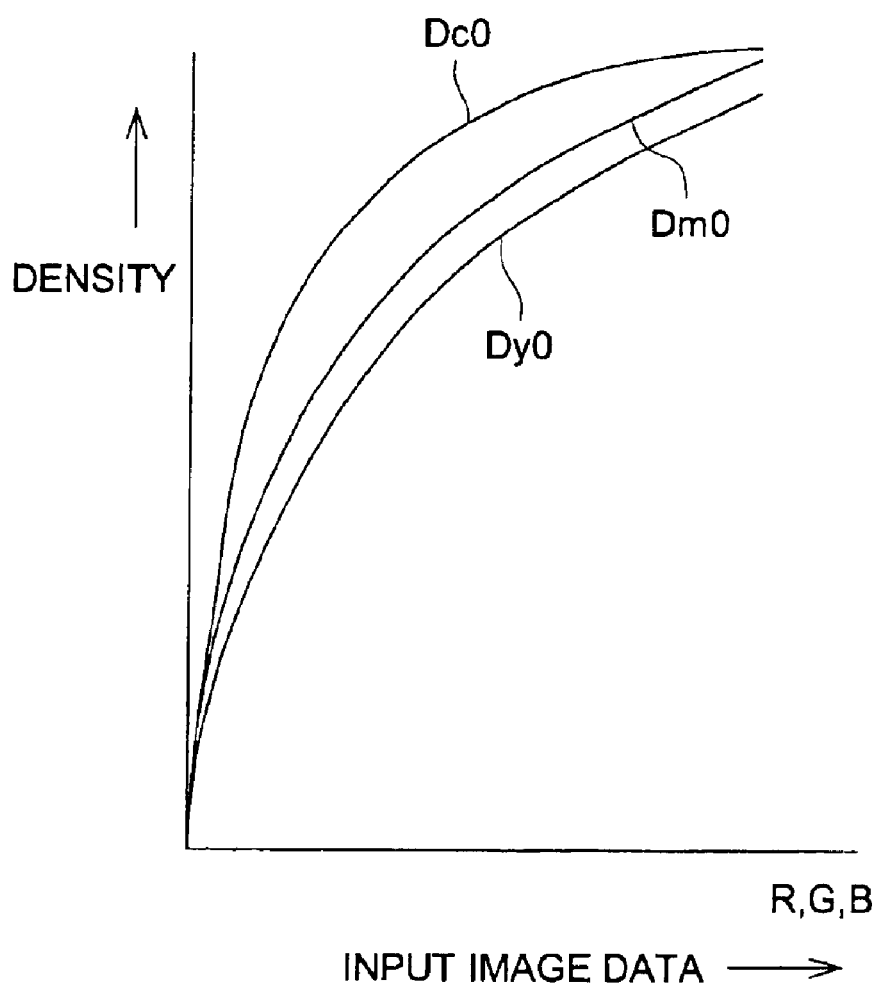
FIG. 7 is a graph explaining a conventional example.
Figure 8:
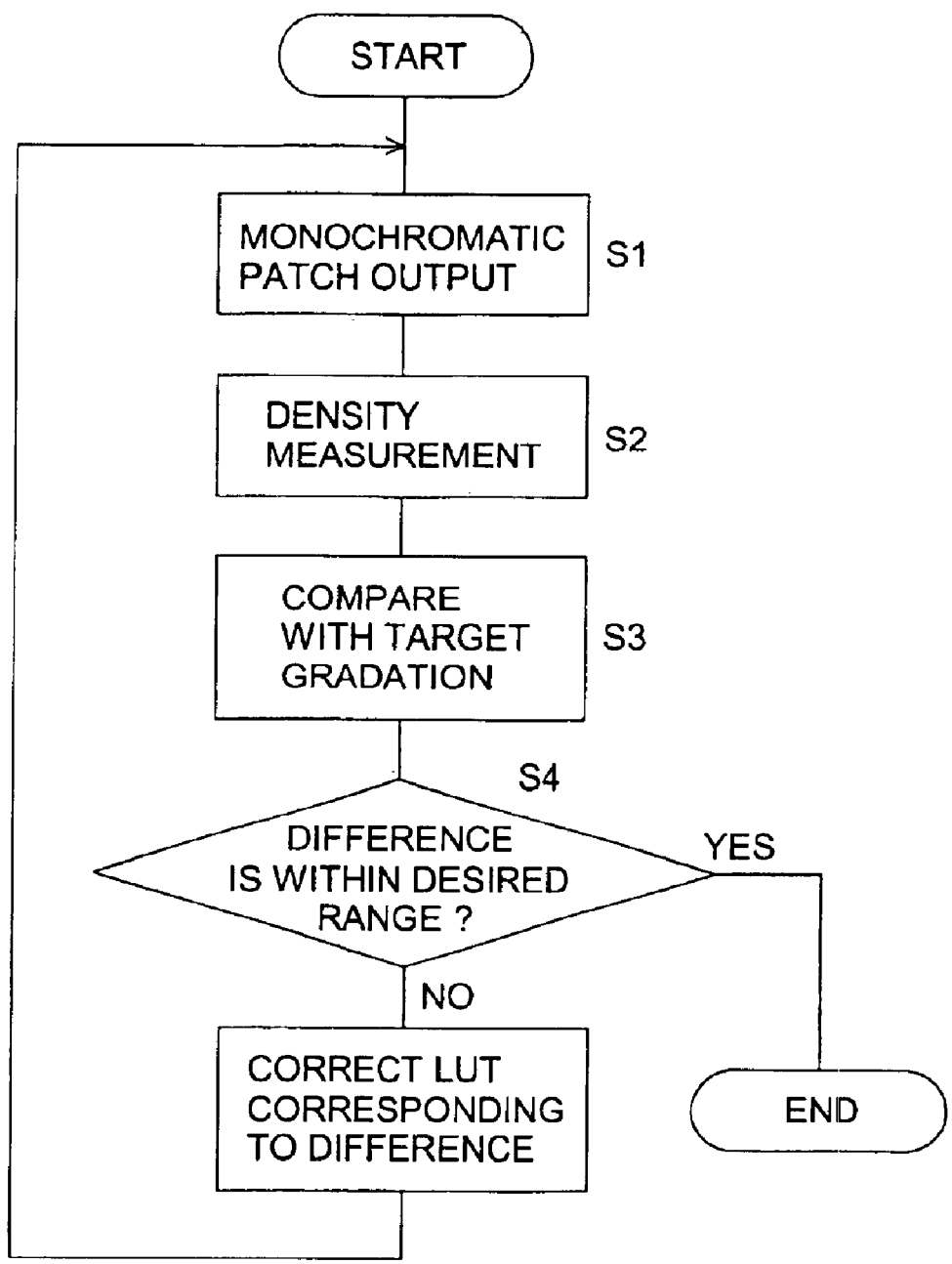
FIG. 8 is a flow chart showing a conventional example.

In FIG. 5, a specific example of the composite LUT shown in FIG. 4 is shown. The C character LUT and the LUT for the image, shown in FIG. 10 and FIG. 11, are composed, and one LUT shown in FIG. 5 can be prepared.

In Table 1, the image value and the exposure value for each character kind in the table B and the table C are shown.

The table B in Table 1 is used in the B character table in FIG. 2 (the information is converted from the character information (character size, position, the thickness of the character, color) to the character image data (R, G, B)).

The tables B and C in Table 1 are used in the character table in FIG. 3 (the data is converted from the character image data (R, G, B) to the character exposure control data).

Herein, when the image value area for the character is 0≦character≦3, in R, G, B, 4³=64 kinds of character tables (table B) can be obtained. Although the numeric value area for the image is 256³−64, because 256³>64, there is almost no influence.

TABLE 1

|  |  |  | *C | *C 1 | *C 2 | *C 3 | *C 4 | *C 5 | *C 6 | *C 7 | *C 8 | *C 9 | *C 10 | *C 11 | *C 12 |
|---|---|---|---|---|---|---|---|---|---|---|---|---|---|---|---|
| Table B | Color |  | W | K | K | K | Y | Y | Y | M | M | M | C | C | C |
|  | Thickness |  | F | F | M | T | F | M | T | F | M | T | F | M | T |
|  | Image value | R | 0 | 1 | 2 | 3 | 0 | 0 | 0 | 0 | 0 | 0 | 1 | 2 | 3 |
|  |  | G | 0 | 1 | 2 | 3 | 0 | 0 | 0 | 1 | 2 | 3 | 0 | 0 | 0 |
|  |  | B | 0 | 1 | 2 | 3 | 1 | 2 | 3 | 0 | 0 | 0 | 0 | 0 | 0 |
| Table C | Exposure value | R | 0 | 2010 | 1920 | 1840 | 0 | 0 | 0 | 0 | 0 | 0 | 2030 | 1950 | 1900 |
|  |  | G | 0 | 1910 | 1840 | 1770 | 0 | 0 | 0 | 1950 | 1900 | 1880 | 0 | 0 | 0 |
|  |  | B | 0 | 1820 | 1780 | 1740 | 1880 | 1830 | 1780 | 0 | 0 | 0 | 0 | 0 | 0 |

Note:
*C: kind of the character
W: white
K: black
Y: yellow
M: magenta
C: cyan
F: fine
M: middle
T: thick According to the present invention, in the case where the color of Y (yellow), M (magenta), C (cyan) and black are obtained corresponding to each exposure of B, G, R, when a part of the numeric value range is determined as the output area of the character information, even the character image including fine lines by which the objective color is hardly obtained depending on the MTF or the short time exposure characteristic of the print paper, can be outputted in the objective color.

According to the present invention, even when the (photographic) image and the character including fine lines are composed and expressed, because the color can be respectively controlled, even the character image including fine lines by which the objective color is hardly obtained depending on the MTF or the short time exposure characteristic of the print paper, can be outputted in the objective color, thereby, the above problems can be solved.

What is claimed is:

1. A method for producing a print by exposing an image onto a photosensitive material, comprising the steps of:

extracting character image data and pictorial image data separately from original image data, which originally include said character image data and said pictorial image data;

applying a first image-processing operation to said character image data by employing a first LUT for converting image values of pixels, represented by said character image data, to first exposure control values, so as to generate revised character-image data, which represent said first exposure control values;

applying a second image-processing operation to said pictorial image data by employing a second LUT for converting image values of pixels, represented by said pictorial image data, to second exposure control values, so as to generate revised pictorial-image data, which represent said second exposure control values;

combining said revised character-image data with said revised pictorial-image data, so as to generate processed image data, which include both said revised character-image data and said revised pictorial-image data; and forming an output image on said photosensitive material, based on said processed image data, so as to produce said print.

2. The method for producing a print by exposing an image onto a photosensitive material as defined by claim 1, wherein said first LUT and said second LUT are respectively established in such a manner that a character image and a pictorial image, both being included in said output image, are harmonized with each other.

3. The method for producing a print by exposing an image onto a photosensitive material as defined by claim 1, wherein said photosensitive material is a silver-halide photosensitive material.

4. The method for producing a print by exposing an image onto a photosensitive material as defined by claim 1, wherein contents of said first LUT can be revised as needed, and a revised first LUT is employed in said step of applying said first image-processing operation, when said first LUT is revised to said revised first LUT.

5. The method for producing a print by exposing an image onto a photosensitive material as defined by claim 1, wherein a total range of image data values, included in said original image data, is divided into a first range of image data values for said character image data and a second range of image data values for said pictorial image data, and wherein said character image data and said pictorial image data are discriminated from each other corresponding to said first range and said second range, before said extracting step.

6. The method for producing a print by exposing an image onto a photosensitive material as defined by claim 5, wherein said total range of image data values, included in said original image data, is constituted by image data regions of 24 bits.

7. An apparatus for producing a print by exposing an image onto a photosensitive material comprising:

an extracting section to extract character image data and pictorial image data separately from original image data, which originally include said character image data and said pictorial image data;

a first image-processing section to apply a first image-processing operation to said character image data by employing a first LUT for converting image values of pixels, represented by said character image data, to first exposure control values, so as to generate revised character-image data, which represent said first exposure control values;

a second image-processing section to apply a second image-processing operation to said pictorial image data by employing a second LUT for converting image values of pixels, represented by said pictorial image data, to second exposure control values, so as to generate revised pictorial-image data, which represent said second exposure control values;

a data combining section to combine said revised character-image data with said revised pictorial-image data, so as to generate processed image data, which include both said revised character-image data and said revised pictorial-image data; and an image forming section to form an output image on said photosensitive material, based on said processed image data, so as to produce said print.

8. The apparatus for producing a print by exposing an image onto a photosensitive material as defined by claim 7, wherein said first LUT and said second LUT are respectively established in such a manner that a character image and a pictorial image, both being included in said output image, are harmonized with each other.

9. The apparatus for producing a print by exposing an image onto a photosensitive material as defined by claim 7, wherein said photosensitive material is a silver-halide photosensitive material.

10. The apparatus for producing a print by exposing an image onto a photosensitive material as defined by claim 7, wherein contents of said first LUT can be revised as needed, and said first image-processing section employs a revised first LUT, when said first LUT is revised to said revised first LUT.

11. The apparatus for producing a print by exposing an image onto a photosensitive material as defined by claim 7, wherein a total range of image data values, included in said original image data, is divided into a first range of image data values for said character image data and a second range of image data values for said pictorial image data; and wherein said character image data and said pictorial image data are discriminated from each other corresponding to said first range and said second range, before extracting them from said original image data.

12. The apparatus for producing a print by exposing an image onto a photosensitive material as defined by claim 11, wherein said total range of image data values, included in said original image data, is constituted by image data regions of 24 bits.

* * * * *